US012307952B2

(12) United States Patent
Lee

(10) Patent No.: US 12,307,952 B2
(45) Date of Patent: *May 20, 2025

(54) DISPLAY DEVICE, AND METHOD OF OPERATING A DISPLAY DEVICE

(71) Applicant: SAMSUNG DISPLAY CO., LTD., Yongin-si (KR)

(72) Inventor: Kyung-Hun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,680

(22) Filed: Sep. 28, 2023

(65) Prior Publication Data

US 2024/0029643 A1 Jan. 25, 2024

Related U.S. Application Data

(63) Continuation of application No. 17/814,613, filed on Jul. 25, 2022, now Pat. No. 11,854,469.

(30) Foreign Application Priority Data

Nov. 11, 2021 (KR) ........................ 10-2021-0154543

(51) Int. Cl.

| | |
|---|---|
| ***G09G 5/10*** | (2006.01) |
| ***G09G 3/20*** | (2006.01) |
| ***G09G 3/32*** | (2016.01) |

(52) U.S. Cl.

CPC ............ *G09G 3/32* (2013.01); *G09G 3/2007* (2013.01); *G09G 3/2096* (2013.01);

(Continued)

(58) Field of Classification Search

CPC ...... G09G 3/32; G09G 3/2007; G09G 3/2096; G09G 2310/027; G09G 2320/0247;

(Continued)

(56) References Cited

U.S. PATENT DOCUMENTS 11,854,469 B2 * 12/2023 Lee .......................... G09G 3/32
2015/0103104 A1 * 4/2015 Lee ...................... G09G 3/3648 345/690

(Continued)

FOREIGN PATENT DOCUMENTS

KR 10-2015-0042371 4/2015
KR 10-2017-0077937 7/2017

(Continued)

OTHER PUBLICATIONS

Office Action dated Nov. 17, 2022 in corresponding U.S. Appl. No. 17/814,613.

*Primary Examiner* — Jennifer T Nguyen

(74) *Attorney, Agent, or Firm* — F. CHAU & ASSOCIATES, LLC

(57) ABSTRACT

A display device includes a display panel including a plurality of pixels, and a panel driver configured to drive the display panel. The panel driver receives input image data at a variable input frame frequency, stores the variable input frame frequency as a previous frame frequency by monitoring the variable input frame frequency, determines a reference frequency based on the previous frame frequency, determines a reference luminance as a luminance of the display panel at the reference frequency, and adjusts data voltages applied to the plurality of pixels such that a luminance of the display panel at the variable input frame frequency becomes the reference luminance.

15 Claims, 13 Drawing Sheets

(52) U.S. Cl.
CPC ................. *G09G 2310/027* (2013.01); *G09G 2320/0247* (2013.01); *G09G 2320/0276* (2013.01); *G09G 2320/0626* (2013.01); *G09G 2330/028* (2013.01); *G09G 2340/0435* (2013.01)

(58) Field of Classification Search
CPC ... G09G 2320/0276; G09G 2320/0626; G09G 2330/028; G09G 2340/0435
USPC .......................................................... 345/690
See application file for complete search history.

(56) References Cited

U.S. PATENT DOCUMENTS

| | | | | |
|---|---|---|---|---|
| 2015/0243203 | A1* | 8/2015 | Kim | G09G 3/3291 345/212 |
| 2019/0371250 | A1* | 12/2019 | Baek | G09G 3/3291 |
| 2020/0082781 | A1 | 3/2020 | An et al. | |
| 2020/0202816 | A1 | 6/2020 | Kim et al. | |
| 2021/0142758 | A1 | 5/2021 | Koo et al. | |
| 2023/0148307 | A1 | 5/2023 | Lee | |
| 2023/0306890 | A1* | 9/2023 | Cho | G09G 3/2092 |

FOREIGN PATENT DOCUMENTS

| | | |
|---|---|---|
| KR | 10-2020-0029101 A | 3/2020 |
| KR | 10-2020-0053365 | 5/2020 |
| KR | 10-2020-0075945 | 6/2020 |

* cited by examiner

DISPLAY DEVICE, AND METHOD OF OPERATING A DISPLAY DEVICE

CROSS-REFERENCE TO RELATED APPLICATIONS

This application is a continuation application of U.S. patent application Ser. No. 17/814,613 filed Jul. 25, 2022, which claims priority under 35 U.S.C. § 119 to Korean Patent Application No. 10-2021-0154543, filed on Nov. 11, 2021 in the Korean Intellectual Property Office (KIPO), the disclosures of which are incorporated by reference herein in their entirety.

TECHNICAL FIELD

Embodiments of the inventive concept relate to a display device, and more particularly, to a display device supporting a variable frame mode, and a method of operating the display device.

DISCUSSION OF RELATED ART

A display device may generally display an image at a constant frame rate (or a constant frame frequency) of about 60 Hz or more. However, a frame rate of rendering by a host processor (e.g., an application processor (AP), a graphics processing unit (GPU) or a graphics card) providing frame data to the display device may be different from a frame rate (or a frame frequency) of the display device. In particular, when the host processor provides the display device with frame data for a game image (gaming image) that utilized complicated rendering, a frame rate mismatch may be intensified, and a tearing phenomenon may occur where a boundary line is caused by the frame rate mismatch in an image of the display device.

SUMMARY

Some embodiments provide a display device capable of increasing image quality in a variable frame mode.

Some embodiments provide a method of operating a display device capable of increasing image quality in a variable frame mode.

According to embodiments, there is provided a display device including a display panel including a plurality of pixels, and a panel driver configured to drive the display panel. The panel driver receives input image data at a variable input frame frequency, stores the variable input frame frequency as a previous frame frequency by monitoring the variable input frame frequency, determines a reference frequency based on the previous frame frequency, determines a reference luminance as a luminance of the display panel at the reference frequency, and adjusts data voltages applied to the plurality of pixels such that a luminance of the display panel at the variable input frame frequency becomes the reference luminance.

In embodiments, the panel driver may determine a minimum frequency and a maximum frequency of the previous frame frequency during a predetermined time, and may determine the reference frequency to be between the minimum frequency and the maximum frequency.

In embodiments, the panel driver increases the luminance of the display panel by adjusting the data voltages when the variable input frame frequency is higher than the reference frequency, and may decrease the luminance of the display panel by adjusting the data voltages when the variable input frame frequency is lower than the reference frequency.

In embodiments, the panel driver may determine an average frequency of the previous frame frequency during a predetermined time, and may determine the reference frequency as the average frequency.

In embodiments, the panel driver may adjust the data voltages applied to the plurality of pixels by adjusting gray levels of the input image data.

In embodiments, the panel driver may include a data driver configured to generate the data voltages corresponding to output image data, and to apply the data voltages to the plurality of pixels, and a controller configured to generate the output image data by adjusting gray levels of the input image data such that the luminance of the display panel at the variable input frame frequency becomes the reference luminance.

In embodiments, the panel driver may adjust the data voltages applied to the plurality of pixels by adjusting voltage levels of gamma reference voltages.

In embodiments, the panel driver may include a gamma voltage generator configured to generate gamma reference voltages, a data driver configured to generate the data voltages corresponding to output image data based on the gamma reference voltages, and to apply the data voltages to the plurality of pixels, and a controller configured to generate the output image data based on the input image data, and to provide the gamma voltage generator with a gamma control signal for adjusting voltage levels of the gamma reference voltages such that the luminance of the display panel at the variable input frame frequency becomes the reference luminance.

According to embodiments, there is provided a display device including a display panel including a plurality of pixels, and a panel driver configured to drive the display panel. The panel driver receives input image data at a variable input frame frequency within a variable frequency range from a minimum frequency to a maximum frequency, determines a reference frequency within the variable frequency range, determines a reference luminance as a luminance of the display panel at the reference frequency, and adjusts data voltages applied to the plurality of pixels such that a luminance of the display panel at the variable input frame frequency becomes the reference luminance.

In embodiments, the reference frequency may be determined to be between the minimum frequency and the maximum frequency.

In embodiments, the panel driver may increase the luminance of the display panel when the variable input frame frequency is higher than the reference frequency by adjusting the data voltages, and may decrease the luminance of the display panel when the variable input frame frequency is lower than the reference frequency by adjusting the data voltages.

In embodiments, the reference frequency may be determined as an average frequency of the minimum frequency and the maximum frequency.

In embodiments, the panel driver may increase the luminance of the display panel by a maximum compensation amount when the variable input frame frequency is the maximum frequency by adjusting the data voltages, and may decrease the luminance of the display panel by the maximum compensation amount when the variable input frame frequency is the minimum frequency by adjusting the data voltages.

In embodiments, the reference frequency may be determined with respect to each of a plurality of gray regions.

In embodiments, with respect to a first gray region less than a reference gray level, the panel driver may determine a first reference frequency within the variable frequency range, and may determine a first reference luminance as a luminance of the display panel at the first reference frequency, With respect to a second gray region greater than or equal to the reference gray level, the panel driver may determine a second reference frequency within the variable frequency range, and may determine a second reference luminance as a luminance of the display panel at the second reference frequency. With respect to the input image data representing first gray levels within the first gray region, the panel driver may adjust the first gray levels of the input image data such that the luminance of the display panel at the variable input frame frequency becomes the first reference luminance. With respect to the input image data representing second gray levels within the second gray region, the panel driver may adjust the second gray levels of the input image data such that the luminance of the display panel at the variable input frame frequency becomes the second reference luminance.

In embodiments, the first reference frequency may be the minimum frequency, and the second reference frequency may be between the minimum frequency and the maximum frequency.

In embodiments, with respect to the input image data representing the first gray levels, the panel driver may increase the luminance of the display panel by increasing the first gray levels of the input image data. With respect to the input image data representing the second gray levels, the panel driver may increase the luminance of the display pane by increasing the second gray levels of the input image data in a case where the variable input frame frequency is higher than the second reference frequency, and may decrease the luminance of the display panel by decreasing the second gray levels of the input image data in a case where the variable input frame frequency is lower than the second reference frequency.

According to embodiments, there is provided a method of operating a display device. In the method, input image data are received at a variable input frame frequency, the variable input frame frequency is stored as a previous frame frequency by monitoring the variable input frame frequency, a reference frequency is determined based on the previous frame frequency, a reference luminance is determined as a luminance of a display panel at the reference frequency, and data voltages applied to a plurality of pixels of the display panel are adjusted such that a luminance of the display panel at the variable input frame frequency becomes the reference luminance.

In embodiments, to determine the reference frequency, a minimum frequency and a maximum frequency of the previous frame frequency during a predetermined time may be determined, and the reference frequency may be determined to be between the minimum frequency and the maximum frequency.

In embodiments, to determine the reference frequency, an average frequency of the previous frame frequency during a predetermined time may be determined, and the reference frequency may be determined as the average frequency.

As described above, in a display device and a method of operating the display device according to embodiments, a reference frequency may be determined within a variable frequency range of a variable input frame frequency of input image data, or may be determined by monitoring the variable input frame frequency of the input image data. Further, a reference luminance may be determined as a luminance of a display panel at the reference frequency, and data voltages may be adjusted such that a luminance of the display panel at the variable input frame frequency becomes the reference luminance. Accordingly, a flicker may be minimized or reduced when the variable input frame frequency is changed.

BRIEF DESCRIPTION OF THE DRAWINGS

The above and other features of the inventive concept will become more apparent by describing in detail embodiments thereof with reference to the accompanying drawings.

DETAILED DESCRIPTION OF THE EMBODIMENTS

Figure 1:
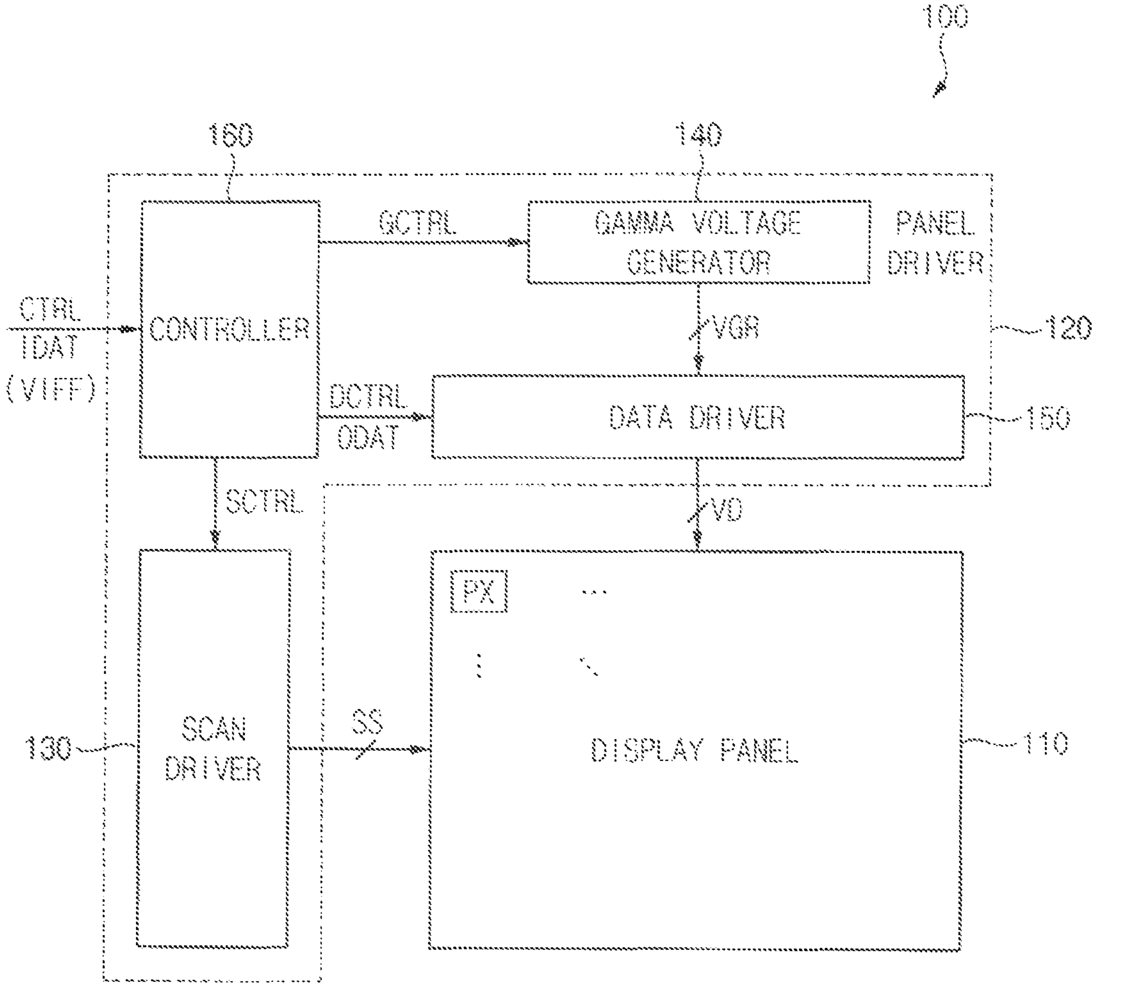
FIG. 1 is a block diagram illustrating a display device according to embodiments of the inventive concept.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

Herein, when one value is described as being about equal to another value or being substantially the same as or equal to another value, it is to be understood that the values are identical, the values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Figure 2:
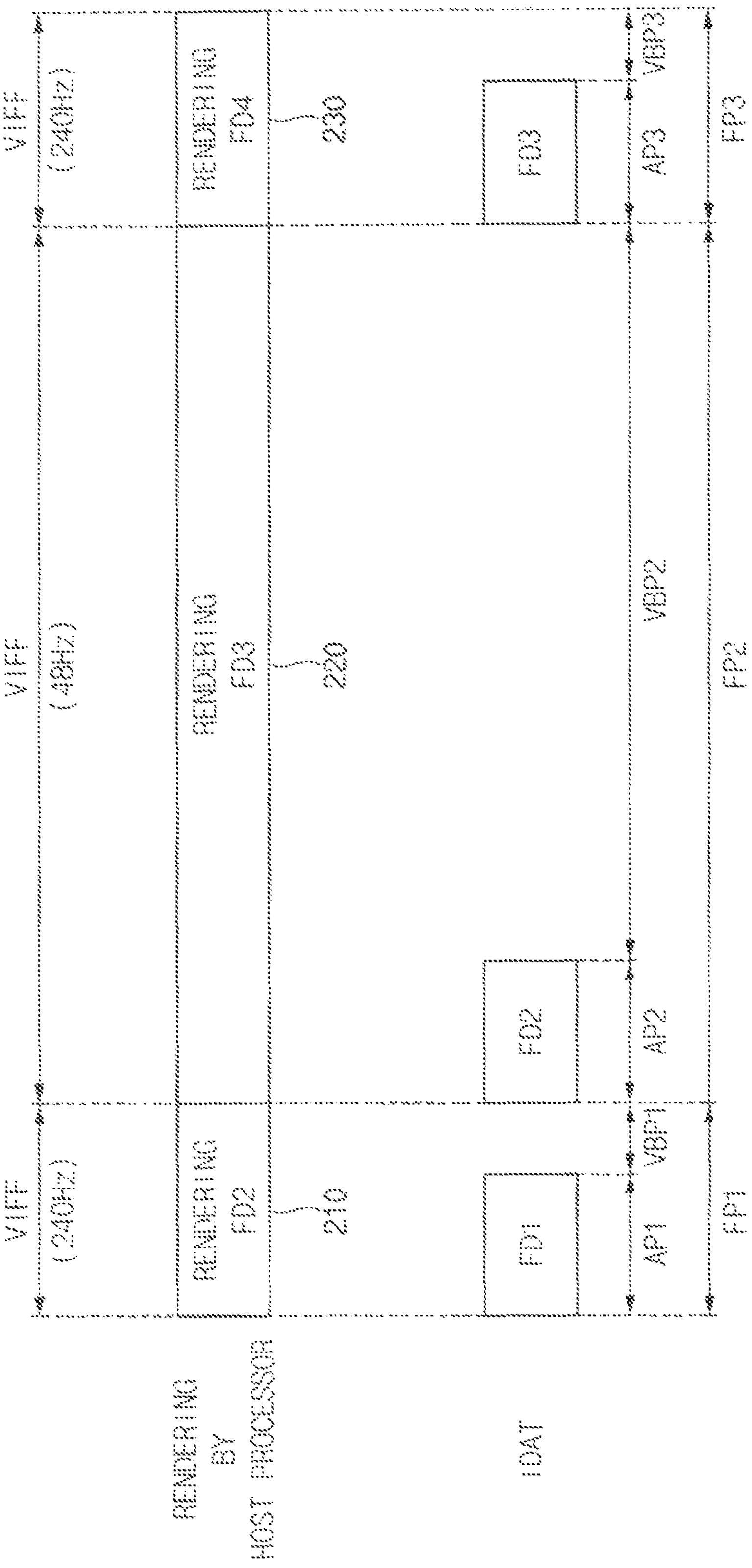
FIG. 2 is a timing diagram illustrating an example of input image data that are input at a variable input frame frequency.
Figure 3:
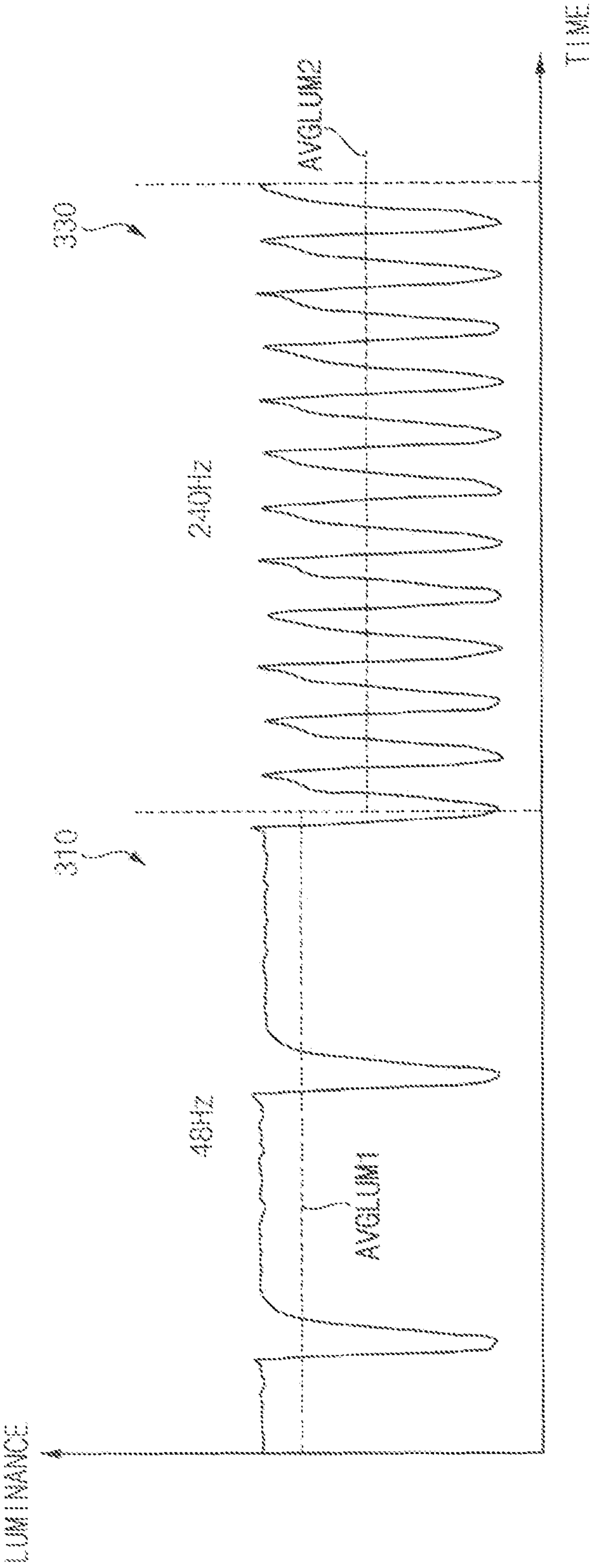
FIG. 3 is a diagram illustrating an example of luminances of a display panel driven at different frame frequencies in a case where a data compensation operation is not performed.
Figure 4:
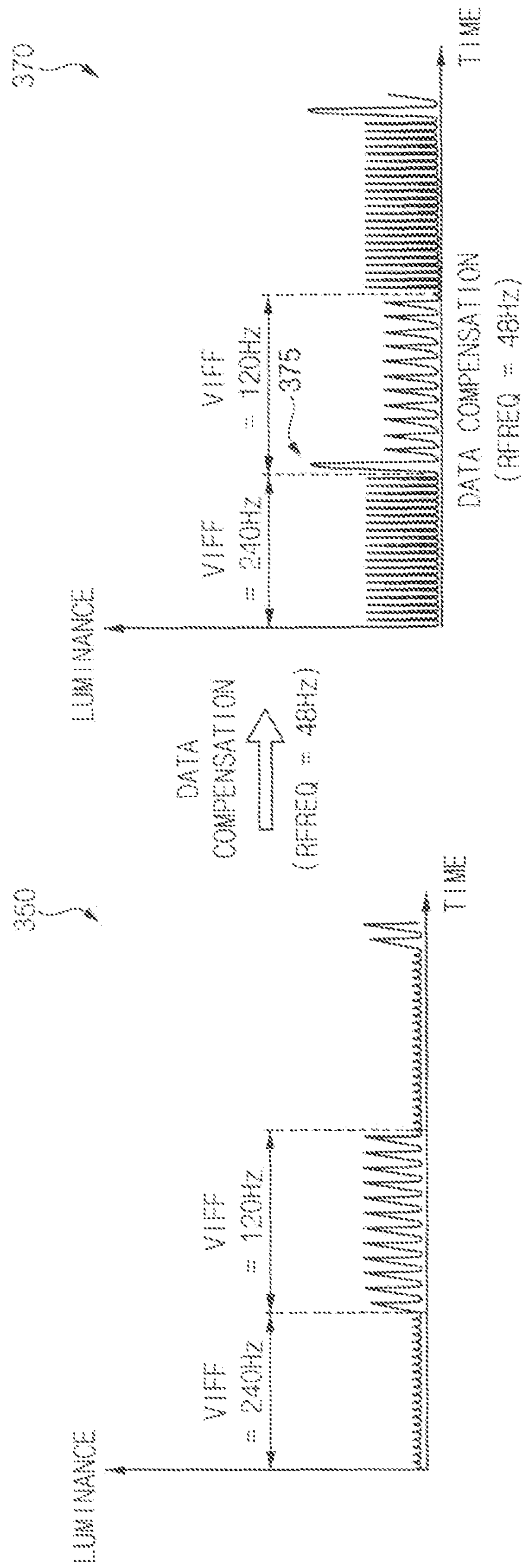
FIG. 4 is a diagram illustrating an example of a luminance of a display panel in a case where a data compensation operation is not performed, and an example of a luminance of a display panel in a case where a data compensation operation with a minimum frequency as a reference frequency is performed.
Figure 5:
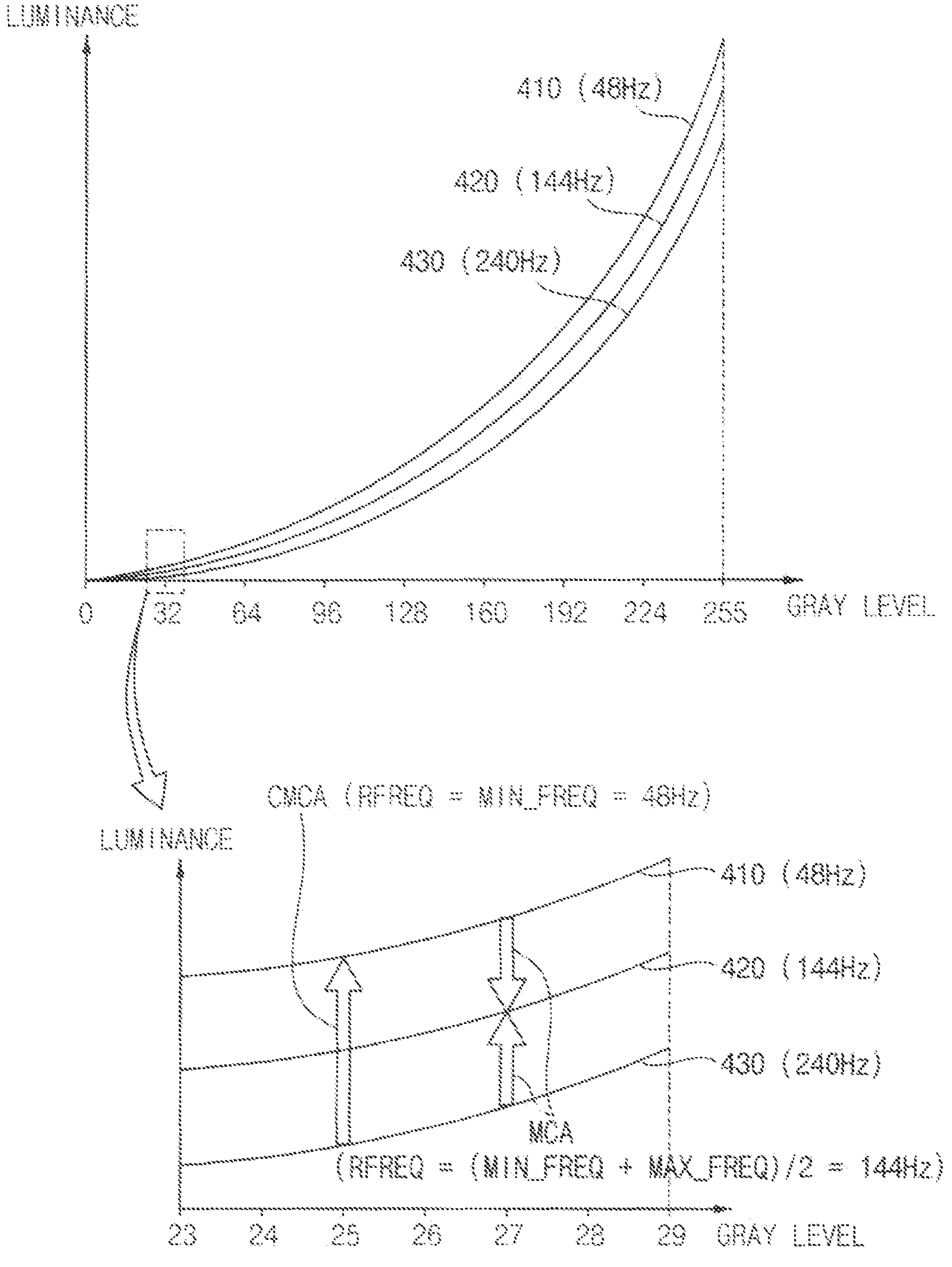
FIG. 5 is a diagram illustrating an example of a luminance according to a gray level for describing an example of a data compensation operation of a display device according to embodiments of the inventive concept.
Figure 6:
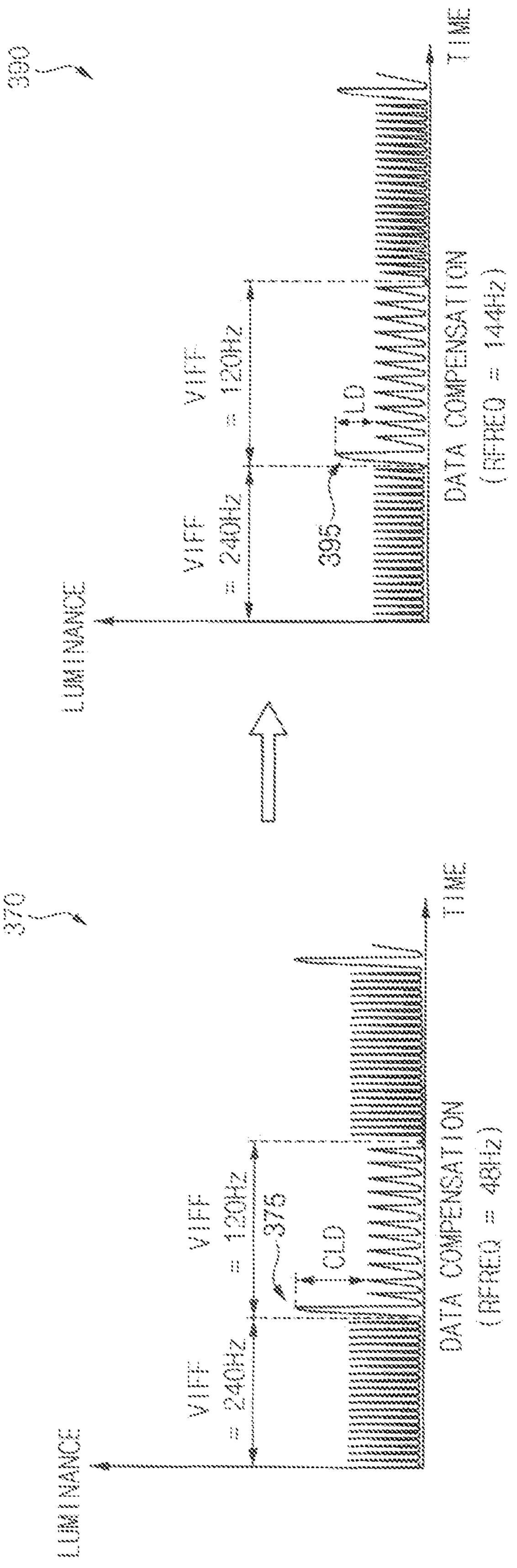
FIG. 6 is a diagram illustrating an example of a luminance of a display panel in a case where a data compensation operation with a minimum frequency as a reference frequency is performed, and an example of a luminance of a display panel in a case where a data compensation operation with a frequency between a minimum frequency and a maximum frequency as a reference frequency is performed according to embodiments of the inventive concept.

FIG. 1 is a block diagram illustrating a display device according to embodiments of the inventive concept. FIG. 2 is a timing diagram illustrating an example of input image data that are input at a variable input frame frequency. FIG. 3 is a diagram illustrating an example of luminances of a display panel driven at different frame frequencies in a case where a data compensation operation is not performed. FIG. 4 is a diagram illustrating an example of a luminance of a display panel in a case where a data compensation operation is not performed, and an example of a luminance of a display panel in a case where a data compensation operation with a minimum frequency as a reference frequency is performed. FIG. 5 is a diagram illustrating an example of a luminance according to a gray level for describing an example of a data compensation operation of a display device according to embodiments of the inventive concept. FIG. 6 is a diagram illustrating an example of a luminance of a display panel in a case where a data compensation operation with a minimum frequency as a reference frequency is performed, and an example of a luminance of a display panel in a case where a data compensation operation with a frequency between a minimum frequency and a maximum frequency as a reference frequency is performed according to embodiments of the inventive concept.

Referring to FIG. 1, a display device 100 according to embodiments may include a display panel 110 that includes a plurality of pixels PX, and a panel driver 120 that drives the display panel 110. In some embodiments, the panel driver 120 may include a scan driver 130 that provides scan signals SS to the plurality of pixels PX, a gamma voltage generator 140 that generates gamma reference voltages VGR, a data driver 150 that provides data voltages VD to the plurality of pixels PX based on the gamma reference voltages VGR, and a controller 160 that controls the scan driver 130, the gamma voltage generator 140 and the data driver 150.

The display panel 110 may include a plurality of data lines, a plurality of scan lines, and the plurality of pixels PX coupled thereto. In some embodiments, each pixel PX may include, but is not limited to, a switching transistor that transfers the data voltage VD in response to the scan signal SS, a storage capacitor that stores the data voltage VD transferred by the switching transistor, a driving transistor that generates a driving current based on the data voltage VD stored in the storage capacitor, and a light emitting element that emits light based on the driving current generated by the driving transistor. According to embodiments, the light emitting element may be, but is not limited to, a light emitting diode (LED), an organic light emitting diode (OLED), a quantum dot (QD) light emitting element, etc.

The scan driver 130 may provide the scan signals SS to the plurality of pixels PX through the plurality of scan lines based on a scan control signal SCTRL received from the controller 160. In some embodiments, the scan driver 130 may sequentially provide the scan signals SS to the plurality of pixels PX on a row-by-row basis. In some embodiments, the scan control signal SCTRL may include, but is not limited to, a scan start signal and a scan clock signal. In some embodiments, the scan driver 130 may be integrated or formed in a peripheral portion of the display panel 110. In some embodiments, the scan driver 130 may be implemented with one or more integrated circuits.

The gamma voltage generator 140 may be controlled by a gamma control signal GCTRL received from the controller 160, and may generate one or more gamma reference voltages VGR. In some embodiments, the gamma control signal GCTRL may represent voltage levels of the gamma reference voltages VGR, and the gamma voltage generator 140 may generate the gamma reference voltages VGR having the voltage levels represented by the gamma control signal GCTRL. In some embodiments, the gamma voltage generator 140 may be included in the data driver 150. In some embodiments, the gamma voltage generator 140 may be located outside the data driver 150.

The data driver 150 may receive output image data ODAT and a data control signal DCTRL from the controller 160, may receive the gamma reference voltages VGR from the gamma voltage generator 140, and may provide the data voltages VD to the plurality of pixels PX through the plurality of data lines based on the output image data ODAT, the data control signal DCTRL and the gamma reference voltages VGR. In some embodiments, the data driver 150 may generate respective gray voltages corresponding to respective gray levels based on the gamma reference voltages VGR, may select the gray voltages corresponding to the output image data ODAT, and may provide, as the data voltages VD, the selected gray voltages to the plurality of pixels PX. In some embodiments, the data control signal DCTRL may include, but is not limited to, an output data enable signal, a horizontal start signal and a load signal. In some embodiments, the data driver 150 and the controller 160 may be implemented with a single integrated circuit, and the single integrated circuit may be referred to as a timing controller embedded data driver (TED). In some embodiments, the data driver 150 and the controller 160 may be implemented with separate integrated circuits.

The controller 160 (e.g., a timing controller) may receive input image data IDAT and a control signal CTRL from an external host processor (e.g., an application processor (AP), a graphics processing unit (GPU) or a graphics card). In some embodiments, the input image data IDAT may be RGB image data including red image data, green image data and blue image data. In some embodiments, the control signal CTRL may include, but is not limited to, a vertical synchronization signal, a horizontal synchronization signal, an input data enable signal, a master clock signal, etc. The controller 160 may generate the scan control signal SCTRL, the gamma control signal GCTRL, the data control signal DCTRL and the output image data ODAT based on the control signal CTRL and the input image data IDAT. The controller 160 may control an operation of the scan driver 130 by providing the scan control signal SCTRL to the scan driver 130, may control an operation of the gamma voltage generator 140 by providing the gamma control signal GCTRL to the gamma voltage generator 140, and may control an operation of the data driver 150 by providing the data control signal DCTRL and the output image data ODAT to the data driver 150.

The host processor may provide the input image data DAT to the display panel 110 at a variable input frame frequency VIFF (or a variable frame rate) by changing a time length of a blank period in each frame period. The controller 160 may receive the input image data DAT from the host processor at the variable input frame frequency VIFF. In some embodiments, the variable input frame frequency VIFF may be changed within a variable frequency range from a predetermined minimum frequency to a predetermined maximum frequency. For example, the minimum frequency may be about 48 Hz, the maximum frequency may be about 240 Hz, and the variable frequency range of the variable input frame frequency VIFF may be from about 48 Hz to about 240 Hz. The controller 160 may control the data driver 150 and the scan driver 130 to drive the display panel 110 at the variable input frame frequency VIFF. In some embodiments, a mode of the display device 100 in which the display panel 110 is driven at the variable input frame frequency VIFF may be referred to as a variable frame mode. For example, the variable frame mode may be, but is not limited to, a FreeSync mode, a G-Sync mode, a Q-Sync mode, etc.

In the example illustrated in FIG. 2, the host processor may perform rendering, and the display device 100 may display rendered image according to the rendered image in frame periods FP1, FP2 and FP3. The renderings 210, 220 and 230 performed by the host processor may not be constant or regular, for example, in a case where the host processor renders game image data. The host processor may provide the input image data DAT including frame data FD1, FD2 and FD3 to the display device 100 in synchronization with these irregular periods of the renderings in the variable frame mode. In the variable frame mode, each of the frame periods FP1, FP2 and FP3 may include an active period (e.g., AP1, AP2 and AP3) having a constant time length, and the host processor may provide the frame data FD1, FD2 and FD3 to the display device 100 at the variable input frame frequency VIFF by changing a time length of a variable blank period (e.g., VBP1, VBP2 and VBP3) in each of the frame periods FP1, FP2 and FP3.

For example, while the host processor performs a rendering 210 for second frame data FD2 at a frequency of about 240 Hz in a first frame period FP1, the host processor may provide first frame data FD1 to the display device 100 during an active period AP1 of the first frame period FP1 at the variable input frame frequency VIFF of about 240 Hz in the first frame period FP1. Subsequently, the host processor may provide the second frame data FD2 that is rendered in the first frame period FP1 to the display device 100 during an active period AP2 of a second frame period FP2, and may continue a vertical blank period VBP2 of the second frame period FP2 until a rendering 220 for third frame data FD3 is completed. For example, in the second frame period FP2, the rendering 220 for the third frame data FD3 may be performed at a frequency of about 48 Hz, and the host processor may provide the second frame data FD2 to the display device 100 at the variable input frame frequency VIFF of about 48 Hz by increasing a time length of the variable blank period VBP2 in the second frame period FP2. In a third frame period FP3, the host processor may perform a rendering 230 for fourth frame data FD4 again at a frequency of about 240 Hz, and may provide the third frame data FD3 to the display device 100 during an active period AP3 of the third frame period FP3 at the variable input frame frequency VIFF of about 240 Hz.

As described above, in the variable frame mode, each frame period FP1, FP2 and FP3 may include an active period (e.g., AP1, AP2 and AP3) having a constant time length regardless of the variable input frame frequency VIFF, and a variable blank period (e.g., VBP1, VBP2 and VBP3) having a variable time length corresponding to the variable input frame frequency VIFF. For example, the time length of the variable blank period VBP1, VBP2 and VBP3 may increase as the variable input frame frequency VIFF decreases. In one embodiment, the controller 160 may receive the input image data DAT at the variable input frame frequency VIFF, and may output the output image data ODAT to the data driver 150 at a driving frequency that is substantially the same as the variable input frame frequency VIFF. Accordingly, the display device 100 supporting the variable frame mode may display an image in synchronization with the variable input frame frequency VIFF, which may reduce or prevent a tearing phenomenon that may be caused by a frame frequency mismatch.

However, in a case where a data compensation operation (or a luminance compensation operation) according to the variable input frame frequency VIFF, or the driving frequency of the display panel 110, is not performed in the variable frame mode, a luminance of the display panel 110 may be changed according to the variable input frame frequency VIFF, or the driving frequency of the display panel 110. For example, in the case where the data compensation operation according to the variable input frame frequency VIFF is not performed in the variable frame mode, during the same time, the number of initialization of each pixel PX of the display panel 110 driven at a first driving frequency may be different from the number of initialization of each pixel PX of the display panel 110 driven at a second driving frequency different from the second driving frequency, and thus a luminance of the display panel 110 driven at the first driving frequency may be different from a luminance of the display panel 110 driven at the second driving frequency.

FIG. 3 illustrates an example of a luminance 310 of the display panel 110 driven at a first driving frequency of about 48 Hz, and an example of a luminance 330 of the display panel 110 driven at a second driving frequency of about 240 Hz. As illustrated in FIG. 3, in the case where the data compensation operation according to the variable input frame frequency VIFF is not performed, during the same time (e.g., about 53 ms), each pixel PX of the display panel 110 driven at the first driving frequency of about 48 Hz may be initialized about 2.5 times, and each pixel PX of the display panel 110 driven at the second driving frequency of about 240 Hz may be initialized about 13 times. Accordingly, in the case where the data compensation operation is not performed, an average luminance AVGLUM2 of the display panel 110 driven at the second driving frequency of about 240 Hz may be lower than an average luminance AVGLUM1 of the display panel 110 driven at the first driving frequency of about 48 Hz.

To reduce or prevent a luminance difference of the display panel 110 according to the variable input frame frequency VIFF, or the driving frequency of the display panel 110, the display device 100 according to embodiments may perform the data compensation operation (or the luminance compensation operation) according to the variable input frame frequency VIFF. In some embodiments, the panel driver 120 of the display device 100 may determine a reference frequency within the variable frequency range of the variable input frame frequency VIFF, may determine a reference luminance as a luminance of the display panel 110 at the reference frequency, and may adjust the data voltages VD applied to the plurality of pixels PX such that a luminance of the display panel 110 at the variable input frame frequency VIFF, or a current driving frequency becomes the reference luminance. For example, in an embodiment, the panel driver 120 may determine a reference frequency within the variable frequency range of the variable input frame frequency VIFF, and may determine and set a reference luminance to be the luminance of the display at the reference frequency.

In some embodiments, to perform the data compensation operation, the panel driver 120 may adjust the data voltages VD applied to the plurality of pixels PX by adjusting gray levels represented by the input image data IDAT. For example, the controller 160 may generate the output image data ODAT by adjusting the gray levels of the input image data IDAT such that the luminance of the display panel 110 at the variable input frame frequency VIFF, or the current driving frequency becomes the reference luminance. The data driver 150 may generate adjusted data voltages VD based on the output image data ODAT representing the adjusted gray levels, and may apply the adjusted data voltages VD to the plurality of pixels PX.

In some embodiments, to perform the data compensation operation, the panel driver 120 may adjust the data voltages VD applied to the plurality of pixels PX by adjusting voltage levels of the gamma reference voltages VGR. For example, the controller 160 may provide the gamma voltage generator 140 with the gamma control signal GCTRL for adjusting the voltage levels of the gamma reference voltages VGR such that the luminance of the display panel 110 at the variable input frame frequency VIFF, or the current driving frequency, becomes the reference luminance, and the gamma voltage generator 140 may generate the gamma reference voltages VGR having the adjusted voltage levels in response to the gamma control signal GCTRL. The data driver 150 may generate adjusted data voltages VD based on the gamma reference voltages VGR having the adjusted voltage levels, and may apply the adjusted data voltages VD to the plurality of pixels PX.

For example, as illustrated in FIG. 4, in a first case 350 where the data compensation operation is not performed, a luminance of the display panel 110 driven at a variable input frame frequency VIFF of about 240 Hz and a luminance of the display panel 110 driven at a variable input frame frequency VIFF of about 120 Hz may be different from each other. However, in a second case 370 where the data compensation operation is performed, a luminance of the display panel 110 driven at a variable input frame frequency VIFF of about 240 Hz and a luminance of the display panel 110 driven at a variable input frame frequency VIFF of about 120 Hz may be similar to each other. However, in a display device according to a comparative example where the data compensation operation is performed, a reference frequency RFREQ may be determined as the minimum frequency (e.g., about 48 Hz) of the variable frequency range of the variable input frame frequency VIFF, the reference luminance may be determined at the minimum frequency that is the reference frequency RFREQ, and the data compensation operation may be performed based on the reference luminance corresponding to the minimum frequency. In this case, as illustrated as the second case 370 in FIG. 4, in a frame period in which the variable input frame frequency VIFF is changed, the data compensation operation may be performed based on a wrong reference luminance, and the display panel 110 may have an undesired luminance 375. That is, the variable input frame frequency VIFF in a current frame period can be known at an end time point of the current frame period, or a start time point of the next frame period, and thus the data compensation operation in the current frame period may be performed in accordance with the variable input frame frequency VIFF in a previous frame period. Thus, as illustrated as the second case 370 in FIG. 4, in a frame period in which the variable input frame frequency VIFF is changed from about 240 Hz to about 120 Hz, since the data compensation operation is performed in accordance with about 240 Hz while the display panel 110 is driven at a driving frequency of about 120 Hz, the display panel 110 may have the undesired luminance 375, and a flicker may occur in the display device according to a comparative example.

To reduce this error of the data compensation operation, unlike the display device according to the comparative example described above determining the reference luminance at the minimum frequency, the display device 100 according to embodiments of the inventive concept may determine and set the reference frequency RFREQ to be between the minimum frequency and the maximum frequency of the variable frequency range of the variable input frame frequency VIFF. In some embodiments, the panel driver 120 may determine and set the reference frequency RFREQ to be any frequency between the minimum frequency and the maximum frequency. In some embodiments, the panel driver 120 may determine and set the reference frequency RFREQ to be an average frequency of the minimum frequency and the maximum frequency. For example, in a case where the variable frequency range of the variable input frame frequency VIFF is from about 48 Hz to about 240 Hz, the panel driver 120 may determine and set the reference frequency RFREQ to be (48+240)/2, or about 144 Hz, may determine and set the reference luminance to be a luminance of the display panel 110 driven at about 144 Hz, and may perform the data compensation operation based on the reference luminance corresponding to about 144 Hz.

For example, as illustrated in FIG. 5, in a case where the data compensation operation is not performed, a luminance 420 of the display panel 110 driven at a frequency between the minimum frequency and the maximum frequency or the average frequency (e.g., about 144 Hz) may be lower than a luminance 410 of the display panel 110 driven at the minimum frequency MIN_FREQ (e.g., about 48 Hz) of the variable frequency range, and may be higher than a luminance 430 of the display panel 110 driven at the maximum frequency MAX_FREQ (e.g., about 240 Hz) of the variable frequency range. Since the display device according to the comparative example determines the reference frequency RFREQ as the minimum frequency MIN_FREQ, the display device according to the comparative example may only increase a luminance of the display panel 110 by performing the data compensation operation. Further, in a case where the variable input frame frequency VIFF is the maximum frequency MAX_FREQ, the display device according to the comparative example may increase the luminance of the display panel 110 by a maximum compensation amount CMCA. However, in the display device 100 according to embodiments of the inventive concept, the panel driver 120 may determine the reference frequency RFREQ as the frequency between the minimum frequency MIN_FREQ and the maximum frequency MAX_FREQ, or may determine the reference frequency RFREQ, for example, by dividing a sum of the minimum frequency MIN_FREQ and the maximum frequency MAX_FREQ by 2. Thus, in the display device 100 according to embodiments of the inventive concept, the panel driver 120 may adjust the data voltages VD to increase the luminance of the display panel 110 in a case where the variable input frame frequency VIFF is higher than the reference frequency RFREQ, and may adjust the data voltages VD to decrease the luminance of the display panel 110 in a case where the variable input frame frequency VIFF is lower than the reference frequency RFREQ. For example, the panel driver 120 may adjust the data voltages VD to increase the luminance of the display panel 110 by a maximum compensation amount MCA in a case where the variable input frame frequency VIFF is the maximum frequency MAX_FREQ, and may adjust the data voltages VD to decrease the luminance of the display panel 110 by the maximum compensation amount MCA in a case where the variable input frame frequency VIFF is the minimum frequency MIN_FREQ. Accordingly, the maximum compensation amount MCA by the data compensation operation that increases or decreases the luminance of the display panel 110 in the display device 100 according to embodiments of the inventive concept may be less than the maximum compensation amount CMCA by the data compensation operation that only increases the luminance of the display panel 110 in the display device according to a comparative example.

Further, since a compensation amount of the data compensation operation in the display device 100 according to embodiments of the inventive concept is less than a compensation amount of the data compensation operation in the display device according to the comparative example, the error of the data compensation operation in the frame period in which the variable input frame frequency VIFF is changed may be reduced in the display device 100 according to embodiments of the inventive concept. For example, as illustrated in FIG. 6, in the second case 370 where the reference frequency RFREQ is determined as the minimum frequency MIN_FREQ in the display device according to the comparative example, the display device according to the comparative example may display an image with a luminance 375 having a luminance difference CLD with respect to a desired luminance in the frame period in which the variable input frame frequency VIFF is changed from about 240 Hz to about 120 Hz. However, in a third case 390 where the reference frequency RFREQ is determined as the frequency between the minimum frequency MIN_FREQ and the maximum frequency MAX_FREQ or the average frequency (e.g., about 144 Hz) in the display device 100 according to embodiments of the inventive concept, the display device 100 may display an image with a luminance 395 having a luminance difference LD less than the luminance difference CLD of the display device according to the comparative example with respect to the desired luminance in the frame period in which the variable input frame frequency VIFF is changed from about 240 Hz to about 120 Hz. Accordingly, in the display device 100 according to embodiments of the inventive concept, the flicker at the change of the variable input frame frequency VIFF may be minimized or reduced.

As described above, in the display device 100 according to embodiments of the inventive concept, the panel driver 120 may determine the reference frequency RFREQ within the variable frequency range of the variable input frame frequency VIFF of the input image data IDAT, may determine the reference luminance as the luminance of the display panel 110 at the reference frequency RFREQ, and may adjust the data voltages VD such that the luminance of the display panel 110 at the variable input frame frequency VIFF, or the current driving frequency, becomes the reference luminance. Accordingly, the flicker at the change of the variable input frame frequency VIFF may be minimized or reduced.

Figure 7:
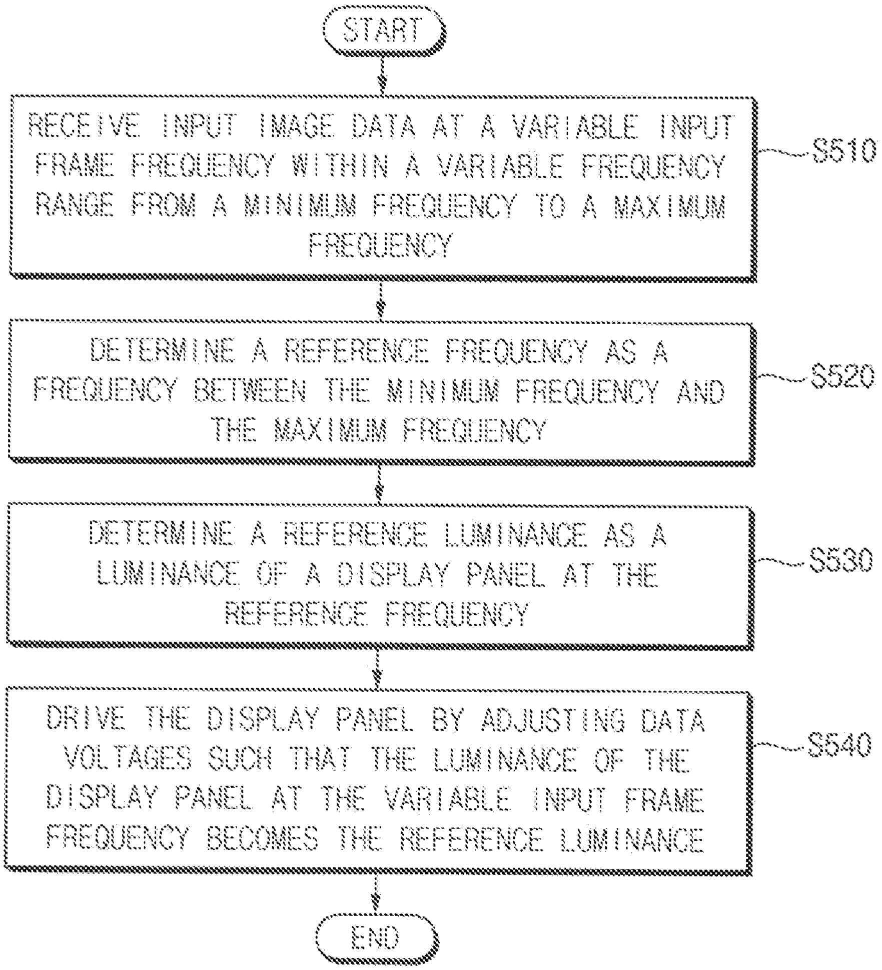
FIG. 7 is a flowchart illustrating a method of operating a display device according to embodiments of the inventive concept.

FIG. 7 is a flowchart illustrating a method of operating a display device according to embodiments of the inventive concept.

Referring to FIGS. 1 and 7, a panel driver 120 of a display device 100 according to embodiments may receive input image data IDAT at a variable input frame frequency VIFF (S510). The variable input frame frequency VIFF may be changed within a variable frequency range from a minimum frequency to a maximum frequency. The panel driver 120 may determine a reference frequency as any frequency between the minimum frequency and the maximum frequency (S520). In some embodiments, the panel driver 120 may determine the reference frequency as an average frequency of the minimum frequency and the maximum frequency, or (the minimum frequency+the maximum frequency)/2.

The panel driver 120 may determine the reference luminance as a luminance of a display panel 110 at the reference frequency (S530). Further, the panel driver 120 may drive the display panel 110 by adjusting data voltages VD such that a luminance of the display panel 110 at the variable input frame frequency VIFF becomes the reference luminance (S540). In some embodiments, the panel driver 120 may adjust gray levels of the input image data IDAT to adjust the data voltages VD. In some embodiments, the panel driver 120 may adjust voltage levels of gamma reference voltages VGR to adjust the data voltages VD.

As described above, unlike a display device according to the comparative example described above that determines the reference frequency as the minimum frequency, in a method of operating the display device 100 according to embodiments of the inventive concept, the panel driver 120 may determine the reference frequency as the frequency between the minimum frequency and the maximum frequency. The panel driver 120 may determine the reference luminance as the luminance of the display panel 110 at the reference frequency, and may adjust the data voltages VD such that the luminance of the display panel 110 at the variable input frame frequency VIFF becomes the reference luminance. Accordingly, a flicker at a change of the variable input frame frequency VIFF may be minimized or reduced.

Figure 8:
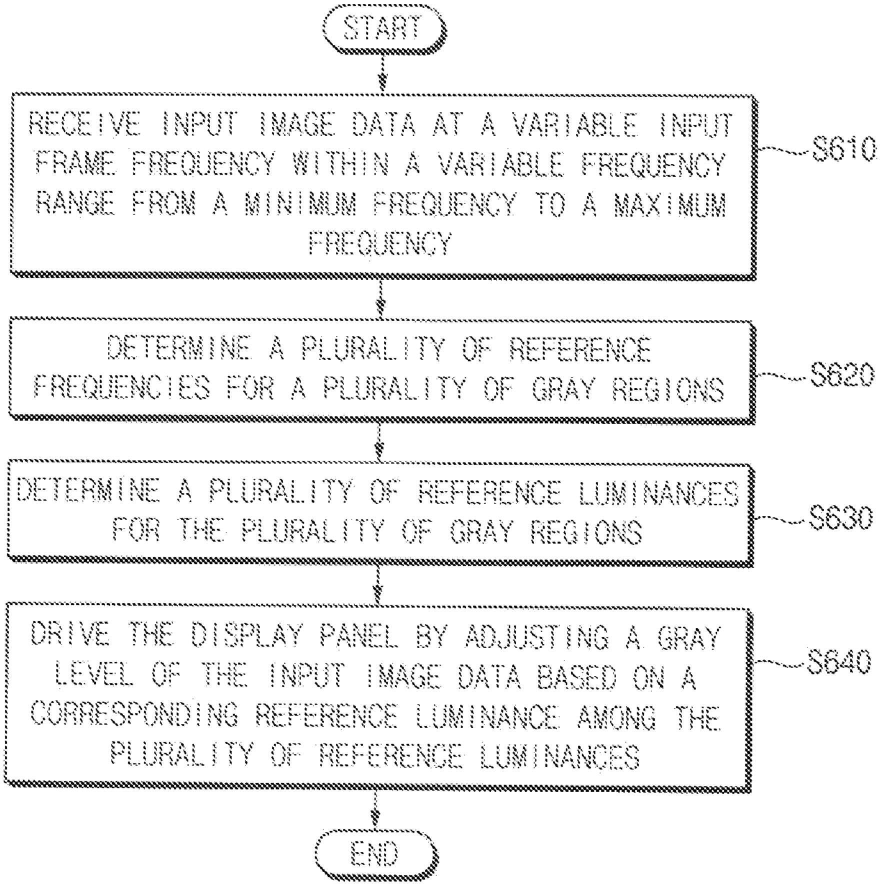
FIG. 8 is a flowchart illustrating a method of operating a display device according to embodiments of the inventive concept.
Figure 9:
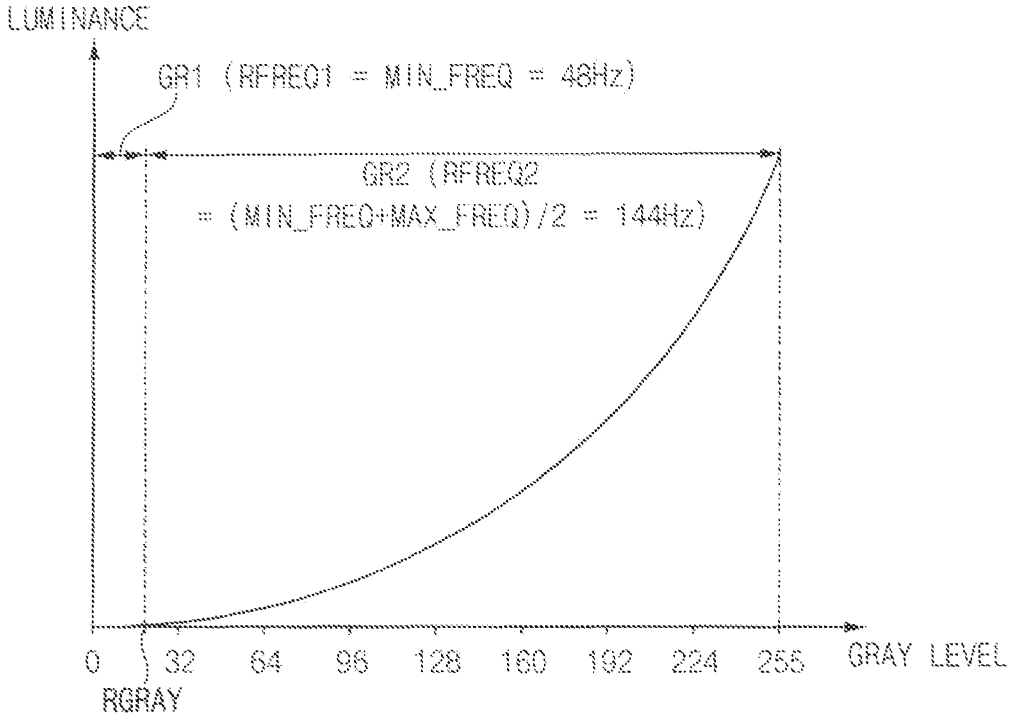
FIG. 9 is a diagram illustrating an example of a luminance according to a gray level for describing an example of a data compensation operation of a display device according to embodiments of the inventive concept.

FIG. 8 is a flowchart illustrating a method of operating a display device according to embodiments of the inventive concept. FIG. 9 is a diagram illustrating an example of a luminance according to a gray level for describing an example of a data compensation operation of a display device according to embodiments of the inventive concept.

Referring to FIGS. 1 and 8, a panel driver 120 of a display device 100 according to embodiments may receive input image data IDAT at a variable input frame frequency VIFF within a variable frequency range from a minimum frequency to a maximum frequency (S610).

The panel driver 120 may determine a plurality of reference frequencies with respect to a plurality of gray regions of the input image data DAT (S620). In some embodiments, as illustrated in FIG. 9, the panel driver 120 may determine a first reference frequency RFREQ1 within the variable frequency range with respect to a first gray region GR1 less than a reference gray level RGRAY, and may determine a second reference frequency RFREQ2 different from the first reference frequency RFREQ1 within the variable frequency range with respect to a second gray region GR2 greater than or equal to the reference gray level RGRAY. For example, the reference gray level RGRAY may be, but is not limited to, an 11-gray level, the first gray region GR1 may be, but is not limited to, from a 0-gray level to a 10-gray level, and the second gray region GR2 may be, but is not limited to, from an 11-gray level to a 255-gray level. Further, for example, as illustrated in FIG. 9, the first reference frequency RFREQ1 for the first gray region GR1 may be the minimum frequency MIN_FREQ (e.g., about 48 Hz) of the variable frequency range, and the second reference frequency RFREQ2 for the second gray region GR2 may be a frequency between the minimum frequency MIN_FREQ and the maximum frequency MAX_FREQ (e.g., about 240 Hz) of the variable frequency range. For example, the second reference frequency RFREQ2 may be an average frequency of the minimum frequency MIN_FREQ and the maximum frequency MAX_FREQ, or (MIN_FREQ+MAX_FREQ)/2, for example, about 144 Hz.

The panel driver 120 may determine a plurality of reference luminances with respect to the plurality of gray regions (S630). In the example of FIG. 9, the panel driver 120 may determine a first reference luminance as a luminance of a display panel 110 at the first reference frequency RFREQ1 with respect to the first gray region GR1, and may determine a second reference luminance as the luminance of the display panel 110 at the second reference frequency RFREQ2 with respect to the second gray region GR2.

The panel driver 120 may drive the display panel 110 by adjusting a gray level represented by the input image data IDAT with respect to each pixel PX based on a reference luminance corresponding to the gray level among the plurality of reference luminances (S640). In the example of FIG. 9, with respect to the input image data IDAT representing first gray levels within the first gray region GR1, the panel driver 120 may adjust the first gray levels of the input image data IDAT such that the luminance of the display panel 110 at the variable input frame frequency VIFF becomes the first reference luminance. Further, with respect to the input image data IDAT representing second gray levels within the second gray region GR2, the panel driver 120 may adjust the second gray levels of the input image data IDAT such that the luminance of the display panel 110 at the variable input frame frequency VIFF becomes the second reference luminance. Further, as illustrated in FIG. 9, in a case where the first reference frequency RFREQ1 for the first gray region GR1 is the minimum frequency MIN_FREQ (e.g., about 48 Hz), and the second reference frequency RFREQ2 for the second gray region GR2 is the frequency (e.g., about 144 Hz) between the minimum frequency MIN_FREQ and the maximum frequency MAX_FREQ, the panel driver 120 may increase the first gray levels of the input image data IDAT to increase the luminance of the display panel 110 with respect to the input image data IDAT representing the first gray levels within the first gray region GR1. Further, with respect to the input image data IDAT representing the second gray levels within the second gray region GR2, the panel driver 120 may increase the second gray levels of the input image data IDAT to increase the luminance of the display panel 110 when the variable input frame frequency VIFF is higher than the second reference frequency RFREQ2, and may decrease the second gray levels of the input image data IDAT to decrease the luminance of the display panel 110 when the variable input frame frequency VIFF is lower than the second reference frequency RFREQ2.

As described above, in a method of operating the display device 100 according to embodiments, the panel driver 120 may determine the plurality of reference frequencies RFREQ1 and RFREQ2 with respect to the plurality of gray regions GR1 and GR2, may determine the plurality of reference luminances corresponding to the plurality of reference frequencies RFREQ1 and RFREQ2, and may perform a data compensation operation based on the plurality of reference luminances for the plurality of gray regions GR1 and GR2.

Figure 10:
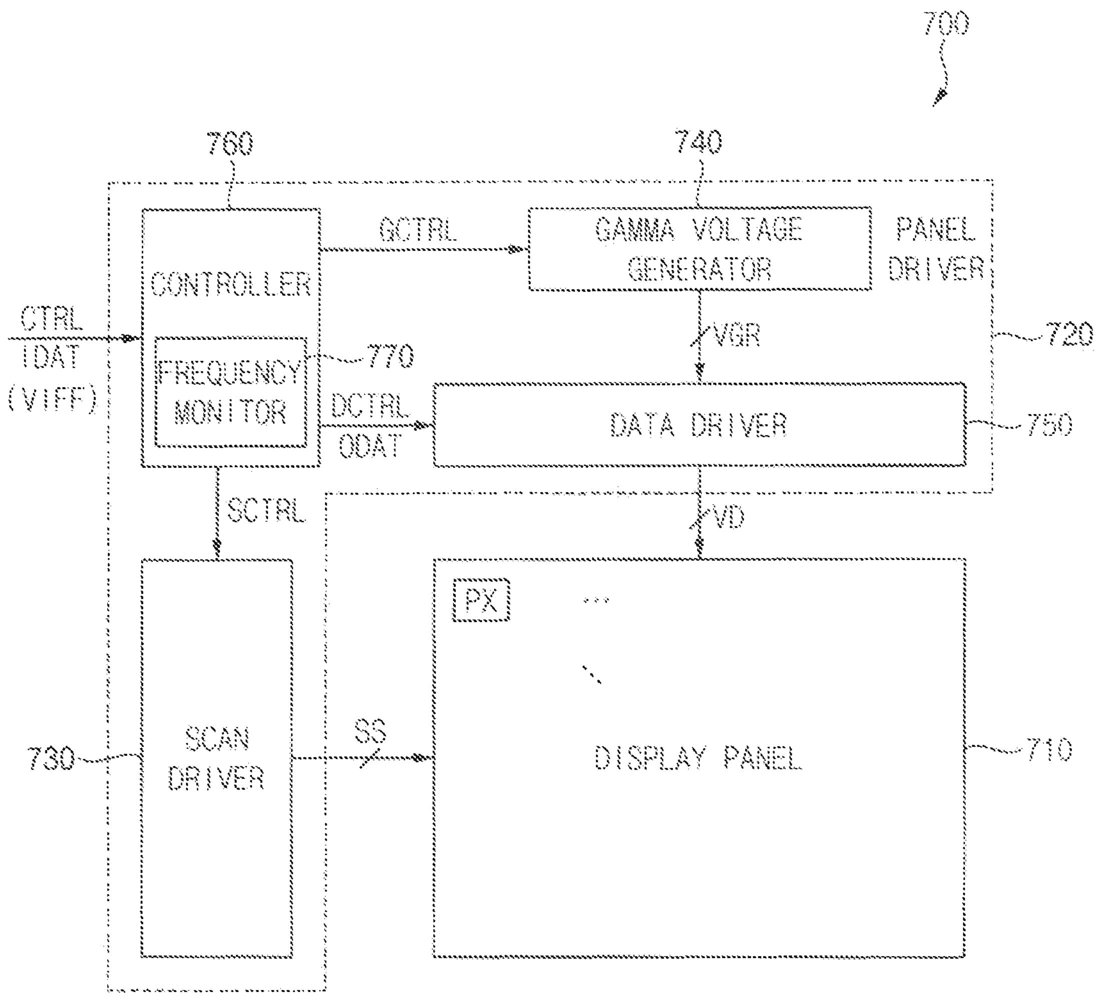
FIG. 10 is a block diagram illustrating a display device according to embodiments of the inventive concept.
Figure 11:
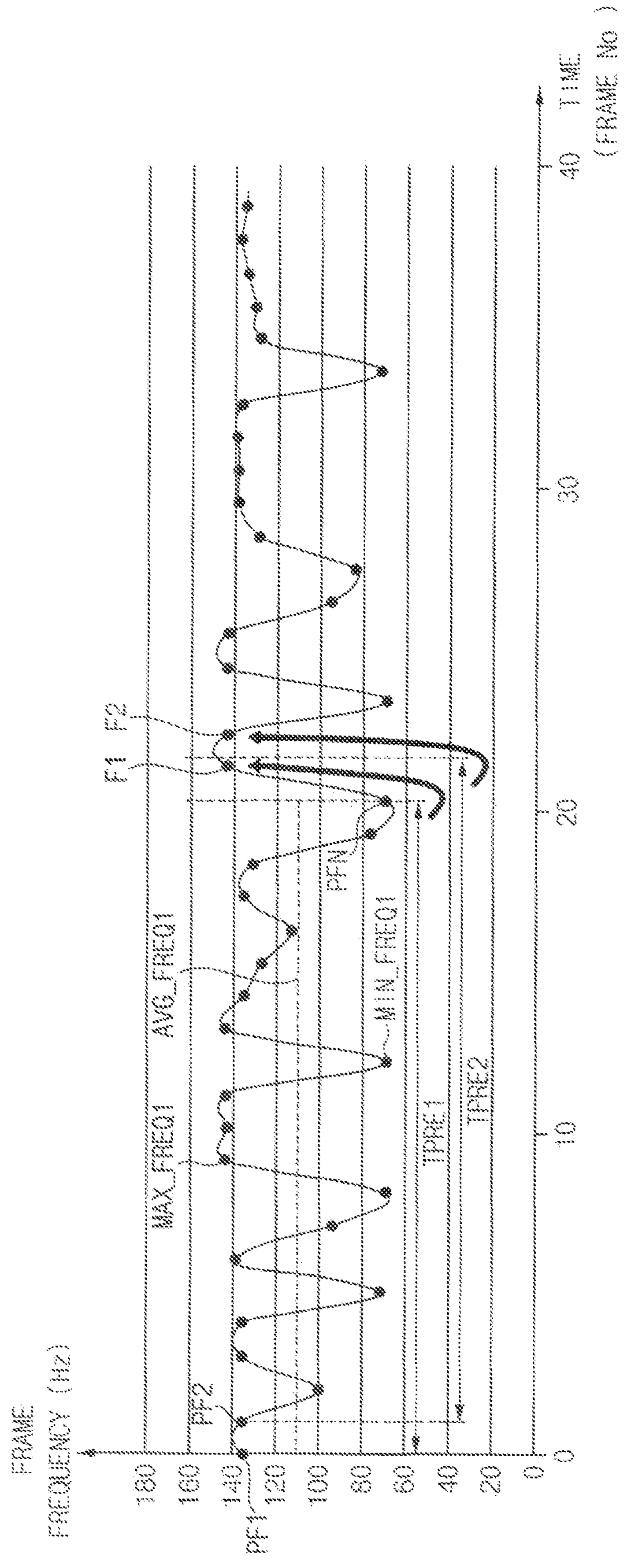
FIG. 11 is a diagram illustrating an example of a frame frequency according to a time for describing an example of a data compensation operation of a display device according to embodiments of the inventive concept.

FIG. 10 is a block diagram illustrating a display device according to embodiments of the inventive concept. FIG. 11 is a diagram illustrating an example of a frame frequency according to a time for describing an example of a data compensation operation of a display device according to embodiments of the inventive concept.

Referring to FIG. 10, a display device 700 according to embodiments may include a display panel 710 that includes a plurality of pixels PX, and a panel driver 720 that drives the display panel 710. In some embodiments, the panel driver 720 may include a scan driver 730, a gamma voltage generator 740, a data driver 750 and a controller 760. The display device 700 of FIG. 10 may have a similar configuration and a similar operation to a display device 100 of FIG. 1, except that the controller 760 may include a frequency monitor 770 that monitors a variable input frame frequency VIFF of input image data IDAT, and that the panel driver 720 determines a reference frequency based on the monitored variable input frame frequency VIFF.

The frequency monitor 770 may monitor the variable input frame frequency VIFF of the input image data IDAT in real time, and may store the monitored variable input frame frequency VIFF as a previous frame frequency. The panel driver 720 may determine a reference frequency based on the previous frame frequency, may determine a reference luminance as a luminance of the display panel 710 at the reference frequency, and may adjust data voltages VD applied to the plurality of pixels PX such that a luminance of the display panel 710 at the variable input frame frequency VIFF, or a current driving frequency, becomes the reference luminance.

In some embodiments, the panel driver 720 may determine a minimum frequency and a maximum frequency of the previous frame frequency during a predetermined time or during a predetermined number of frame periods, and may determine the reference frequency between the minimum frequency and the maximum frequency. Further, the panel driver 720 may adjust the data voltages VD to increase the luminance of the display panel 710 in a case where the variable input frame frequency VIFF, or the current driving frequency is higher than the reference frequency, and may adjust the data voltages VD to decrease the luminance of the display panel 710 in a case where the variable input frame frequency VIFF, or the current driving frequency is lower than the reference frequency. In some embodiments, the panel driver 720 may determine an average frequency of the previous frame frequency during a predetermined time or during a predetermined number of frame periods, and may determine the reference frequency as the average frequency.

For example, as illustrated in FIG. 11, the panel driver 720 may determine the reference frequency base on the previous frame frequency during the predetermined time, or during N frame periods, where N is an integer greater than 1. In some embodiments, in a first frame period F1, the panel driver 720 may determine a reference frequency as a first frequency between a minimum frequency MIN_FREQ1 and a maximum frequency MAX_FREQ1 of previous frame frequencies during a first previous time TPRE1, or during first through N-th previous frame periods PF1, PF2, . . . , PFN, and may perform a data compensation operation based on a reference luminance corresponding to the reference frequency. Further, in a second frame period F2, the panel driver 720 may determine a reference frequency as a second frequency between a minimum frequency and a maximum frequency of previous frame frequencies during a second previous time TPRE2, or during second through N-th previous frame periods PF1, PF2, . . . , PFN and the first frame period F1, and may perform the data compensation operation based on a reference luminance corresponding to the reference frequency.

In some embodiments, in the first frame period F1, the panel driver 720 may determine a reference frequency as an average frequency AVG_FREQ1 of the previous frame frequencies during the first previous time TPRE1, or during the first through N-th previous frame periods PF1, PF2, . . . , PFN, and may perform the data compensation operation based on a reference luminance corresponding to the reference frequency. For example, the average frequency AVG-_FREQ1 in the first frame period F1 may be calculated by dividing a sum of the variable input frame frequencies VIFF in the first through N-th previous frame periods PF1, PF2, . . . , PFN by N. Further, in the second frame period F2, the panel driver 720 may determine a reference frequency as an average frequency of the previous frame frequencies during the second previous time TPRE2, or during the second through N-th previous frame periods PF1, PF2, . . . , PFN and the first frame period F1, and may perform the data compensation operation based on a reference luminance corresponding to the reference frequency.

Unlike the display device 100 of FIG. 1 that determines the reference frequency as a frequency between a minimum frequency and a maximum frequency of a variable frequency range of the variable input frame frequency VIFF, the display device 700 of FIG. 10 may determine the reference frequency as the average frequency AVG_FREQ1 of the variable input frame frequency VIFF monitored by the frequency monitor 770, and thus, may perform the data compensation operation suitable for an actual variable frequency range of the variable input frame frequency VIFF. For example, a host processor may provide the input image data IDAT to the display device 700 within a variable frequency range determined according to a type of the host processor. Further, the actual variable frequency range of the variable input frame frequency VIFF of the input image data IDAT provided by an arbitrary host processor to the display device 700 may be narrower than the variable frequency range of the variable input frame frequency VIFF supported by the display device 700. In this case, the display device 700 may perform the data compensation operation suitable for the actual variable frequency range of the variable input frame frequency VIFF by monitoring the variable input frame frequency VIFF of the input image data IDAT provided by the host processor.

Further, in a case where a host processor provides the input image data IDAT for a particular image to the display device 700, for example, in a case where the host processor provides the input image data IDAT for a game image, an actual variable frequency range of the variable input frame frequency VIFF of the input image data IDAT may be narrower than the variable frequency range of the variable input frame frequency VIFF supported by the display device 700. In this case, the display device 700 may perform the data compensation operation suitable for the actual variable frequency range of the variable input frame frequency VIFF by monitoring the variable input frame frequency VIFF of the input image data IDAT provided by the host processor.

As described above, in the display device 700 according to embodiments, the panel driver 720 may determine the reference frequency by monitoring the variable input frame frequency VIFF of the input image data IDAT, may determine the reference luminance as the luminance of the display panel 710 at the reference frequency, and may adjust the data voltages VD such that the luminance of the display panel 710 at the variable input frame frequency VIFF, or the current driving frequency, becomes the reference luminance. Accordingly, in the display device 700 according to embodiments, the data compensation operation may be performed suitably for the actual variable frequency range of the variable input frame frequency VIFF, and a flicker at a change of the variable input frame frequency VIFF may be minimized or reduced.

Figure 12:
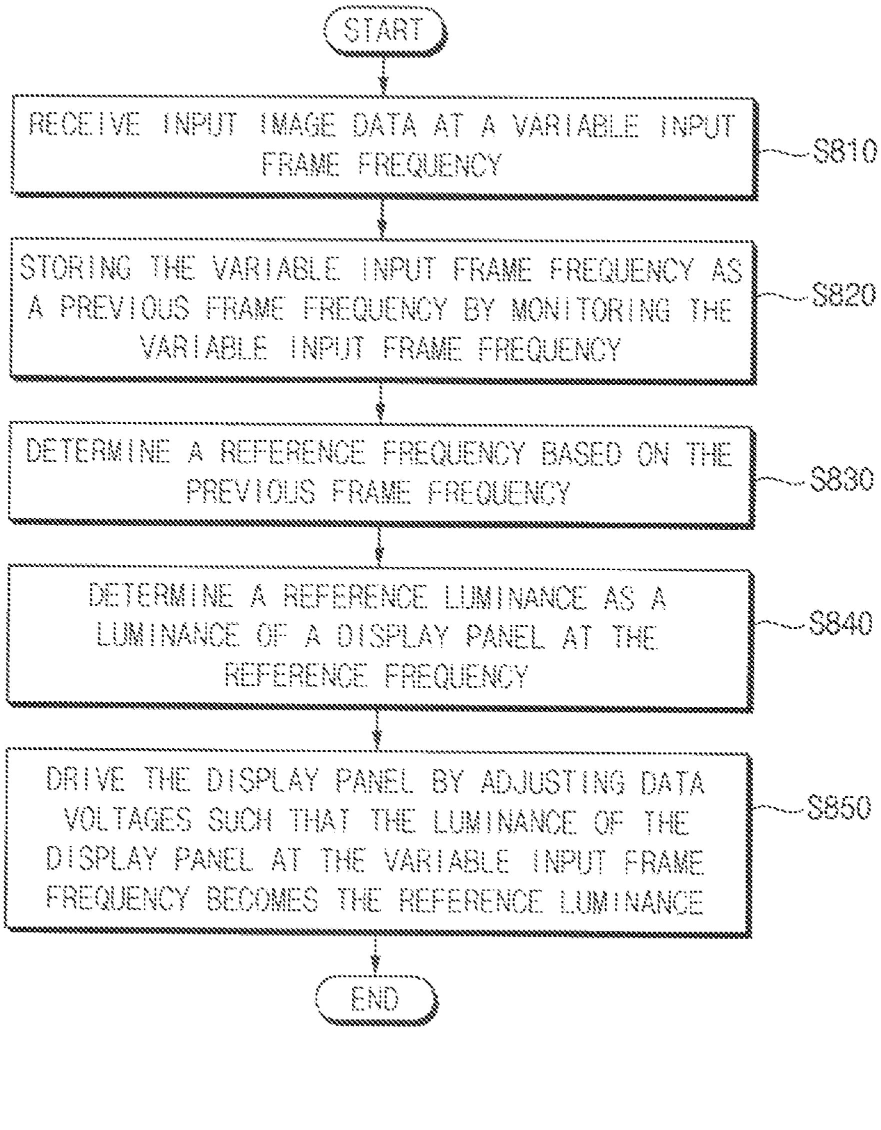
FIG. 12 is a flowchart illustrating a method of operating a display device according to embodiments of the inventive concept.

FIG. 12 is a flowchart illustrating a method of operating a display device according to embodiments.

Referring to FIGS. 10 and 12, a panel driver 720 of a display device 700 according to embodiments may receive input image data DAT at a variable input frame frequency VIFF (S810). The panel driver 720 may monitor the variable input frame frequency VIFF, and may store the variable input frame frequency VIFF as a previous frame frequency (S820).

The panel driver 720 may determine a reference frequency based on the previous frame frequency (S830). In some embodiments, the panel driver 720 may determine a minimum frequency and a maximum frequency of the previous frame frequency during a predetermined time, and may determine the reference frequency as a frequency between the minimum frequency and the maximum frequency. In some embodiments, the panel driver 720 may determine an average frequency of the previous frame frequency during a predetermined time, and may determine the reference frequency as the average frequency.

The panel driver 720 may determine a reference luminance as a luminance of a display panel 710 at the reference frequency (S840), and may adjust data voltages DV applied to a plurality of pixels PX of the display panel 710 such that the luminance of a display panel 710 at the variable input frame frequency VIFF, or a current driving frequency, becomes the reference luminance (S850). Accordingly, in a method of operating the display device 700 according to embodiments, a data compensation operation may be performed suitably for an actual variable frequency range of the variable input frame frequency VIFF, and a flicker at a change of the variable input frame frequency VIFF may be minimized or reduced.

Figure 13:
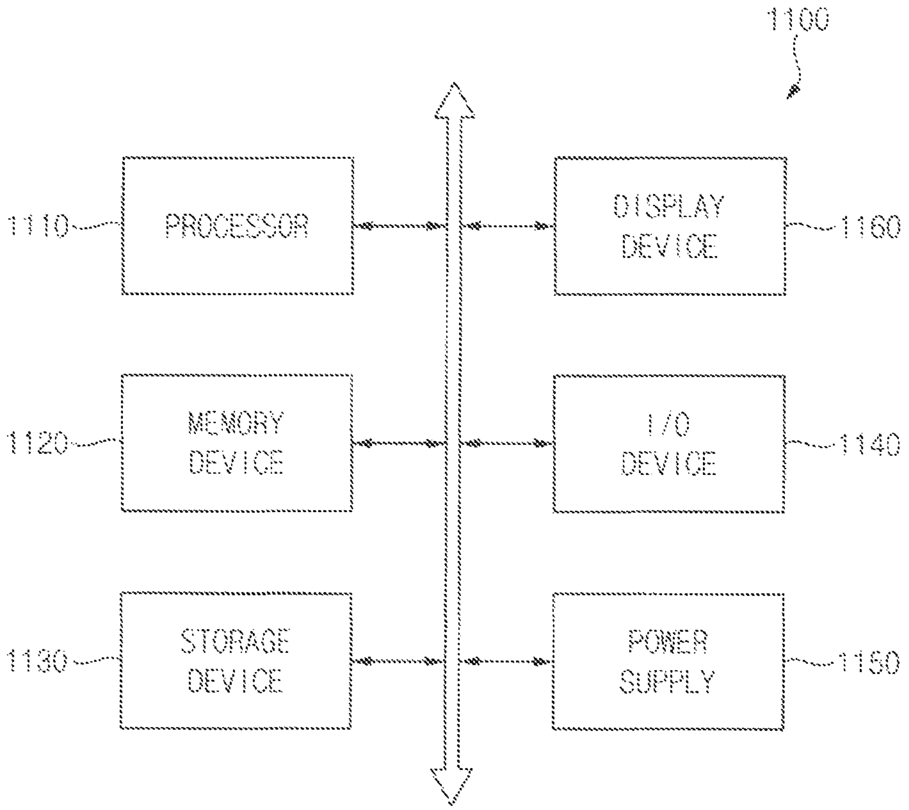
FIG. 13 is a block diagram illustrating an electronic device including a display device according to embodiments of the inventive concept.

FIG. 13 is a block diagram illustrating an electronic device including a display device according to embodiments of the inventive concept.

Referring to FIG. 13, an electronic device 1100 may include a processor 1110, a memory device 1120, a storage device 1130, an input/output (I/O) device 1140, a power supply 1150, and a display device 1160. The electronic device 1100 may further include a plurality of ports for communicating with, for example, a video card, a sound card, a memory card, a universal serial bus (USB) device, other electronic devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be, for example, a solid state drive (SSD) device, a hard disk drive (HDD) device, a CD-ROM device, etc. The I/O device 1140 may be an input device such as, for example, a keyboard, a keypad, a mouse, a touch screen, etc, and an output device such as, for example, a printer, a speaker, etc. The power supply 1150 may supply power for operations of the electronic device 1100. The display device 1160 may be coupled to other components through the buses or other communication links.

In the display device 1160, a reference frequency may be determined within a variable frequency range of a variable input frame frequency of input image data, or may be determined by monitoring the variable input frame frequency of the input image data. Further, a reference luminance may be determined as a luminance of a display panel at the reference frequency, and data voltages may be adjusted such that the luminance of the display panel at the variable input frame frequency becomes the reference luminance. Accordingly, a flicker at a change of the variable input frame frequency may be minimized or reduced.

Embodiments of the inventive concept may be applied to any display device 1160 supporting an adaptive sync mode, and any electronic device 1100 including the display device 1160. For example, embodiments of the inventive concepts may be applied to a smartphone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

Referring to a comparative example, to prevent or reduce a tearing phenomenon that may occur where a boundary line is caused by a frame rate mismatch in an image of a display device, a variable frame mode (e.g., a Free-Sync mode, a G-Sync mode, a Q-Sync mode, etc.) may be utilized, in which a host processor provides frame data to a display device with a variable frame rate (or a variable input frame frequency) by changing a time length of a blank period in each frame period. The display device supporting the variable frame mode may display an image in synchronization with the variable frame rate, which may reduce or prevent the tearing phenomenon. However, in this case, a luminance of a display panel driven at a first frame frequency may be different from a luminance of the display panel driven at a second frame frequency different from the first frame frequency, and as a result, a flicker may occur when a frame frequency of the display device is changed. Embodiments of the inventive concept may prevent or reduce a tearing phenomenon, while minimizing or reducing such a flicker, as described above.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood by those of ordinary skill in the art that various changes in form and detail may be made therein without departing from the spirit and scope of the inventive concept as defined by the following claims.

What is claimed is:

1. An electronic device comprising:

a display device including:

a display panel including a plurality of pixels; and a panel driver configured to drive the display panel; and a host processor configured to provide input image data to the display device at a variable input frame frequency, wherein the panel driver is further configured to:

receive the input image data at the variable input frame frequency;

store the variable input frame frequency as a previous frame frequency by monitoring the variable input frame frequency;

determine a reference frequency as a value between a minimum frequency and a maximum frequency of a predetermined variable frequency range of the variable input frame frequency based on the previous frame frequency;

determine a reference luminance as a luminance of the display panel at the reference frequency; and adjust data voltages applied to the plurality of pixels such that a luminance of the display panel at the variable input frame frequency becomes the reference luminance.

2. The electronic device of claim 1, wherein the panel driver is further configured to:

increase the luminance of the display panel by adjusting the data voltages when the variable input frame frequency is higher than the reference frequency; and decrease the luminance of the display panel by adjusting the data voltages when the variable input frame frequency is lower than the reference frequency.

3. The electronic device of claim 1, wherein the panel driver is further configured to:

determine an average frequency of the previous frame frequency during a predetermined time; and determine the reference frequency as the average frequency.

4. The electronic device of claim 1, wherein the panel driver adjusts the data voltages applied to the plurality of pixels by adjusting gray levels of the input image data.

5. The electronic device of claim 1, wherein the panel driver comprises:

a data driver configured to generate the data voltages and to apply the data voltages to the plurality of pixels, wherein the data voltages correspond to output image data; and a controller configured to generate the output image data by adjusting gray levels of the input image data such that the luminance of the display panel at the variable input frame frequency becomes the reference luminance.

6. The electronic device of claim 1, wherein the panel driver adjusts the data voltages applied to the plurality of pixels by adjusting voltage levels of gamma reference voltages.

7. The electronic device of claim 1, wherein the panel driver comprises:

a gamma voltage generator configured to generate gamma reference voltages;

a data driver configured to generate the data voltages based on the gamma reference voltages, and to apply the data voltages to the plurality of pixels, wherein the data voltages correspond to output image data; and a controller configured to generate the output image data based on the input image data, and to provide the gamma voltage generator with a gamma control signal for adjusting voltage levels of the gamma reference voltages such that the luminance of the display panel at the variable input frame frequency becomes the reference luminance.

8. An electronic device comprising:

a display device including:

a display panel including a plurality of pixels; and a panel driver configured to drive the display panel; and a host processor configured to provide input image data to the display device at a variable input frame frequency, wherein the panel driver is further configured to:

receive the input image data at the variable input frame frequency within a predetermined variable frequency range from a minimum frequency to a maximum frequency;

determine a reference frequency as a value between the minimum frequency and the maximum frequency within the variable frequency range of the variable input frame frequency;

determine a reference luminance as a luminance of the display panel at the reference frequency; and adjust data voltages applied to the plurality of pixels such that a luminance of the display panel at the variable input frame frequency becomes the reference luminance.

9. The electronic device of claim 8, wherein the panel driver is further configured to:

increase the luminance of the display panel when the variable input frame frequency is higher than the reference frequency by adjusting the data voltages; and decrease the luminance of the display panel when the variable input frame frequency is lower than the reference frequency by adjusting the data voltages.

10. The electronic device of claim 8, wherein the reference frequency is determined as an average frequency of the minimum frequency and the maximum frequency.

11. The electronic device of claim 10, wherein the panel driver is further configured to:

increase the luminance of the display panel by a maximum compensation amount when the variable input frame frequency is the maximum frequency by adjusting the data voltages; and decrease the luminance of the display panel by the maximum compensation amount when the variable input frame frequency is the minimum frequency by adjusting the data voltages.

12. The electronic device of claim 8, wherein the reference frequency is determined with respect to each of a plurality of gray regions.

13. The electronic device of claim 8, wherein, with respect to a first gray region less than a reference gray level, the panel driver determines a first reference frequency within the variable frequency range, and determines a first reference luminance as a luminance of the display panel at the first reference frequency, wherein, with respect to a second gray region greater than or equal to the reference gray level, the panel driver determines a second reference frequency within the variable frequency range, and determines a second reference luminance as a luminance of the display panel at the second reference frequency, wherein, with respect to the input image data representing first gray levels within the first gray region, the panel driver adjusts the first gray levels of the input image data such that the luminance of the display panel at the variable input frame frequency becomes the first reference luminance, and wherein, with respect to the input image data representing second gray levels within the second gray region, the panel driver adjusts the second gray levels of the input image data such that the luminance of the display panel at the variable input frame frequency becomes the second reference luminance.

14. The electronic device of claim 13, wherein the first reference frequency is the minimum frequency, and wherein the second reference frequency is between the minimum frequency and the maximum frequency.

15. The electronic device of claim 14, wherein, with respect to the input image data representing the first gray levels, the panel driver increases the luminance of the display panel by increasing the first gray levels of the input image data, and wherein, with respect to the input image data representing the second gray levels, the panel driver increases the luminance of the display panel by increasing the second gray levels of the input image data in a case where the variable input frame frequency is higher than the second reference frequency, and decreases the luminance of the display panel by decreasing the second gray levels of the input image data in a case where the variable input frame frequency is lower than the second reference frequency.

* * * * *